Feb. 23, 1932. P. W. DILLON 1,846,709
FASTENING ELEMENT
Filed Dec. 31, 1930
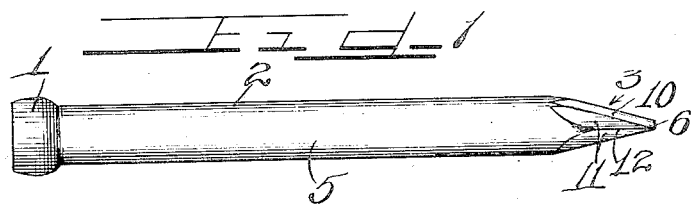
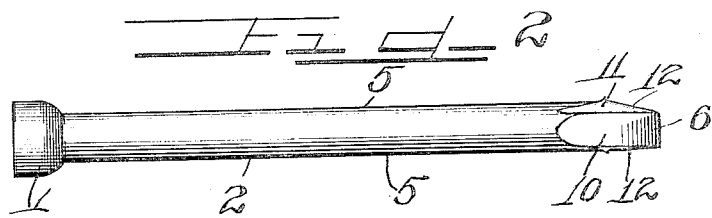
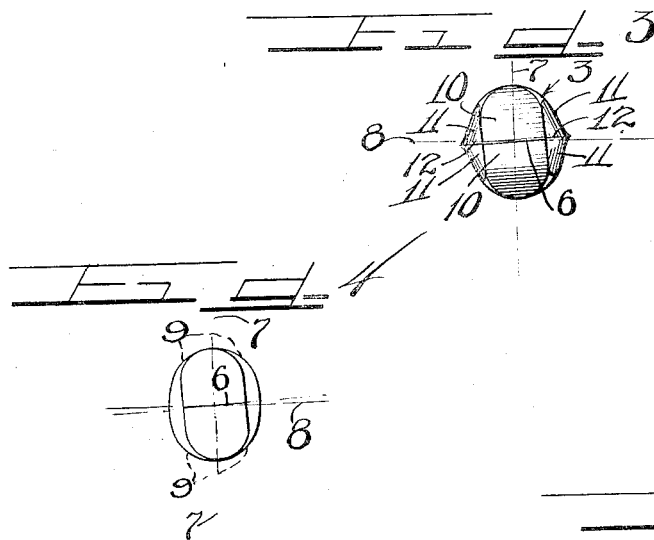
Inventor
Paul W. Dillon
Charles H. Wills Attys.

Patented Feb. 23, 1932

1,846,709

UNITED STATES PATENT OFFICE

PAUL W. DILLON, OF STERLING, ILLINOIS, ASSIGNOR TO NORTHWESTERN BARB WIRE COMPANY, OF STERLING, ILLINOIS, A CORPORATION OF ILLINOIS

FASTENING ELEMENT

Application filed December 31, 1930. Serial No. 505,758.

This invention has to do with fastening means, particularly nails, dowels, and the like, and it is one of the principal objects of the invention to provide a device of this type which is so constructed as to obviate any tendency to crack or split the wood or the like into which it is embedded, and yet one which has sufficient strength to properly function for the purpose for which it is used.

A further object of the invention is to provide an improved nail, dowel, or other fastener of substantially elliptical cross-section which is readily positioned by the fingers, with its major axis in substantial parallelism with the grain of the material.

Another noteworthy object of the invention resides in the provision of a fastening element having an entering wedge of chisel-like construction.

Another important object of the invention consists in providing a fastening element having an entering wedge provided with a cutting edge.

It is a further object of the invention to provide an oval fastening element with an entering wedge having a cutting edge extending substantially transversely to its major axis, so that when the element is driven into grained material, such as wood, with the grain in substantial parallelism with the major axis of the element, a portion of the wood on opposite sides of the cutting edge will be cut away, the edges of the wood engaging such sides and the continuations thereof along the shank of the element, so that the entire surface of the embedded element will be in contact with the wood, and thus offer a great resistance to withdrawal of the element.

In carrying out the invention, I provide a nail whose shank is substantially elliptical in cross-section and has a preferably smooth outer surface. With this construction, the flattened sides of the nail may be gripped at once by the fingers of the hand so that the same may be properly positioned with respect to the grain of the wood or the like in which it is intended to embed the nail. Instead of the usual substantially pyramidal shape of entering wedge, I provide a wedge having a knife edge or chisel-like construction with the edge disposed substantially transversely to the major axis of the element. When the element is embedded in grained material, the fibers of such material engage the entire surface of the element, thereby offering a maximum resistance to separation of the nail or the like from the material. This is not true of the common nail, since with the latter, the fibers exert pressure on the nail or the like only in a direction substantially transverse to the direction of the grain.

Other and further objects and advantages of the present invention will more fully appear from the following detailed description taken in connection with the accompanying drawings, which illustrate a single embodiment thereof, and in which:

Figure 1 is an elevational view showing a nail embodying the invention.

Figure 2 is a plan view of the construction shown in Figure 1.

Figure 3 is an end elevational view of Figure 1, enlarged, showing my novel entering wedge construction.

Figure 4 is a diagrammatic view showing the relationship of the cutting edge of the wedge of the fastening element with respect to the minor axis of the substantially elliptical shank of the fastening element.

Referring now more particularly to the drawings, wherein each element is designated throughout by the same reference character, I illustrate in Figure 1 a nail embodying one form of the invention and comprising a head 1, a shank 2, and an entering wedge indicated generally at 3, the shank 2 having the shape in cross-section substantially of an ellipse as indicated in Figure 4. By reason of the substantially elliptical cross-sectional form of the fastener, it will be appreciated that the long sides 5 thereof will immediately and naturally be engaged or gripped by the finger and thumb of the hand as soon as the nail or the like is picked up, so that no time is lost in positioning the nail so that its longitudinal axis is substantially parallel with the grain of the wood or the like material.

Instead of the usual substantially pyramidal entering wedge or point to be found in the usual type of nail, I employ an entering wedge of special construction. This construction comprises an entering portion in the general form of a chisel, including a chisel or knife edge 6 extending transversely of the major axis 7 of the shank. While the edge 6 may be at right angles to the major axis 7, it is preferably positioned at a slight angle to the minor axis 8. The said edge is preferably of less extent than the minor axis 8 of the shank 2, thus providing for engagement of the zones 9 along the shank 2 by the ends of the fibers which have been cut by said edge 6, and providing further for engagement of the remaining zones along the shank 2 by the fibers which have been spread laterally and compressed. These fibers naturally assume a configuration corresponding to the curved portions of the shank, which portions exert a bending force on the fibers, and the arrangement of the cutting or chisel edge 6 is such that the fibers which are cut thereby are in contact with those portions or zones of the shank 2 which would, in the case of an ordinary nail, not be in contact, or certainly not in tight contact, with the fibers. The latter is due to the fact that in an ordinary nail having a substantially pyramidal entering wedge, substantially no cutting of the fibers occurs, the latter being entire, or, for the most part, merely spread apart. Naturally, under such circumstances, due to the resilience of the fibers and their tendency to assume their initial positions, the fibers adjacent the surface of the shank do not follow such surface all the way around but branch off at spaced points to meet at points spaced from the shank. It will be understood that the cut fibers are spread by the shank, and are bent in the direction of movement of the shank, so that the ends of the fibers exert a gripping pressure on the shank. Thus considerably greater resistance to removal of the shank is offered than in the case of an ordinary nail.

In addition to the sides 10 of the knife edge 6, the entering wedge 3 is additionally bounded by the surfaces 11, the edges 12 intervening each pair of surface 15 being substantially alined with the knife-edge 6.

It will be appreciated from the foregoing that the fastening element forming the subject-matter of this invention is capable of advantageous use in connection with any material whatsoever, but is particularly useful in connection with materials of fibrous or elastic or stratified construction. Moreover, while the shank of the fastening element herein is disclosed as being substantially elliptical or oval-shaped in cross-section, it is to be understood that my novel form of entering wedge may be used advantageously in connection with different forms of shanks. The employment of the special wedge construction is not limited to nails or dowels, but may be used in connection with hooks, or any other device which is to be embedded in any material. Accordingly, it is to be understood that the term "fastener" employed in the appended claims is intended to apply as well to other devices to be embedded, and is not to be construed as limited to the particular type of fastener disclosed herein.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. As an article of manufacture, a fastening member such as a nail comprising a shank of substantially oval cross section including major and minor axes and a substantially chisel-like point substantially coinciding with the minor axis of the shank so that said point will enter wood transversely to the grain thereof when the major axis is disposed in substantial parallelism with the grain of wood or the like, said chisel-like point including a substantially straight knife-like cutting edge of lesser width than the width of said minor axis and of any cross-sectional diameter of said shank whereby all uncut fibers disposed in proximity to the shank as it is driven into the wood are merely stretched out of their normal positions by the contiguous surfaces of the shank throughout its length to augment the holding of the nail in the wood.

2. As an article of manufacture, a fastening member such as a nail including a shank of substantially oval cross section and a chisel-like point thereon having a knife-like cutting edge extending across the lower end of said shank and disalined with respect to the major axis of the shank but disposed at a slight angle to the minor axis.

3. As an article of manufacture, a fastening member such as a nail including a shank of substantially oval cross section and a chisel-like point thereon having a knife-like cutting edge extending diagonally across the lower end of said shank, said cutting edge being of a lesser width than the minor axis of the shank so as to be disposed entirely within the confines of said shank and being disposed at a slight angle to the minor axis of the shank.

In testimony whereof I have hereunto subscribed my name at Sterling, Whiteside County, Illinois.

PAUL W. DILLON.